C. Mowry,
Making Staves.
Nº 44,550.   Patented Oct. 4, 1864.

Witnesses
Henry Morris
C L Topliff

Inventor
Charles Mowry
per Munn & Co
Attorneys

UNITED STATES PATENT OFFICE.

CHARLES MOWRY, OF ONEIDA LAKE, NEW YORK.

IMPROVEMENT IN MACHINES FOR SAWING STAVES.

Specification forming part of Letters Patent No. 44,550, dated October 7, 1864.

*To all whom it may concern:*

Be it known that I, CHARLES MOWRY, of Oneida Lake, in the county of Madison and State of New York, have invented a new and Improved Machine for Sawing Staves; and I do hereby declare that the following is a full, clear, and exact description of the same, reference being had to the accompanying drawings, making a part of this specification, in which—

Figure 1:
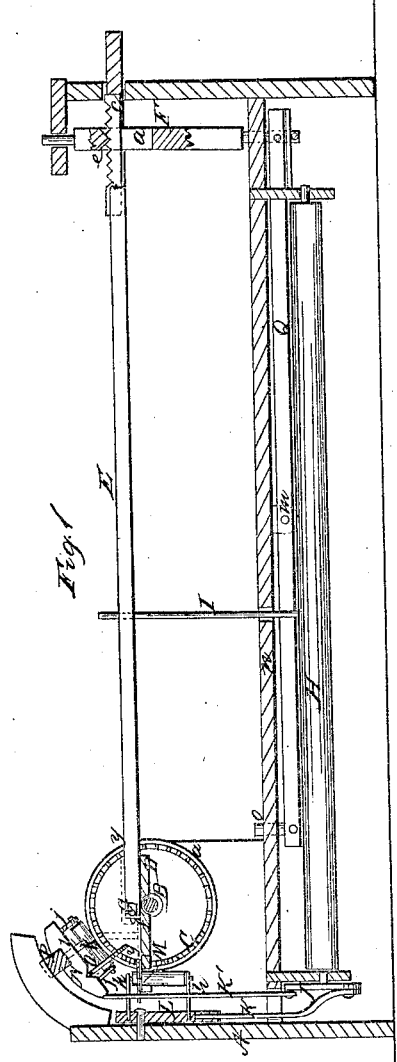
Figure 2:
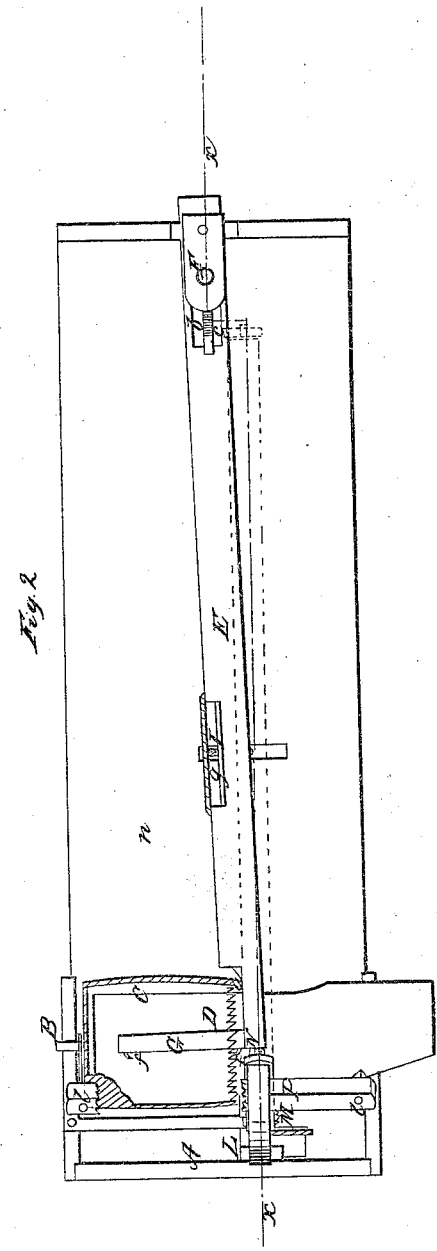

Figure 1 is a side sectional view of my invention, taken in the line $x\ x$, Fig. 2; Fig. 2, a plan or top view of the same, the saw being in section, as indicated by the line $y\ y$, Fig. 1.

Similar letters of reference indicate corresponding parts in the two figures.

This invention consists in the employment or use of a barrel-saw in connection with a novel feeding device and jointing-saws, all arranged in such a manner that the staves may be sawed in proper bilge form and jointed at one and the same operation.

To enable those skilled in the art to fully understand and construct my invention I will proceed to describe it.

A represents a framing, which may be constructed in any proper manner to support the working parts of the device, and B is a shaft which is placed horizontally and transversely in the framing, and has keyed upon it a barrel-saw, C. This saw is constructed in the form of a barrel closed at one end, the opposite end being open with teeth $a$ at its edge. (See Fig. 2.)

D is a board or bed, which passes horizontally into the saw C, and is secured in a horizontal position.

E is a bar placed horizontally in the framing A, and having an oblong slot, $b$, made in it near one end, in which a rack, $c$, is fitted longitudinally and centrally.

F is an upright shaft placed in the framing A, and having a slot, $d$, made in it to allow the rack $c$ to pass through. The upper end of the slot $d$ is beveled, as shown at $e$, to fit into the rack $c$, and the shaft F is allowed a certain degree of vertical play to admit of the beveled end $e$ being raised, so that the bar E may be adjusted longitudinally and the beveled end $e$ fitted in any of the notches of the rack $c$ in order that the bar E may be virtually lengthened or shortened, as required.

The end of the bar E opposite to that where the slot $d$ is made rests upon the bed D, and it has a bar, G, attached to it at right angles, said bar G being provided with dogs $f$ for clamping or securing the "stuff" to G.

In the lower part of the framing A there is fitted longitudinally and horizontally a shaft, H, which has an arm, I, projecting from it, said arm passing through a slot or opening, $g$, in the bar E. One end of this shaft H has a pulley or wheel, J, keyed onto it, to which two rods, K K', are attached near its periphery at opposite points. One of the rods, K, is connected to a slide, L, provided with bearings $h\ h$, in which the journals of an arbor, $i$, are fitted, said arbor having a circular saw, M, upon it. The other rod, K', is connected to a bar, N, which is provided with bearings $j$, in which the journals of an arbor, $k$, are fitted, a circular saw, O, being on the arbor $k$. The bar N is attached to a bar, P, the ends of which are connected to arms $l\ l$, the latter being fitted loosely on the shaft B. The two saws M O have such a relative position with each other and the barrel-saw C that the cutting-planes of the former will form radii with C, or nearly so. The lower end of the shaft F is stopped in one end of a lever, Q, which has its fulcrum at $m$ in the lower part of the framing underneath a bed-piece, $n$, thereof, and the opposite end of lever Q is provided with a vertical pin, $o$, which passes up through $n$. By pressing down the pin $o$ the shaft F will be raised and the rack $c$ freed from the upper beveled end, $e$, of the slot $d$, to admit of the bar E being adjusted, as may be desired.

The operation is as follows: The stave to be operated upon is sawed out of plank, and of the proper dimensions, and the pieces are dogged one at a time to the bar G. The barrel-saw C and saws M O are rotated by any convenient power, and the bar E is shoved toward the saw C, the stuff which is dogged to G passing between the saws M O, which joint it, and then passing into the saw C, which cuts the staves in proper curved form. The saws M O are not on stationary arbors; but, owing to the pulley or wheel J and rods K K', arranged as shown, the saws are made to gradually expand or recede from each other until the center of the stuff reaches them, when they again approach each other until the end of the stuff has passed them. The saws M O joint the staves and in a proper curved form in accordance with the bilge.

I would remark that instead of two jointing-saws, M O, one only may be used by having the board or bed D placed in a radial position relatively with the barrel-saw C. This would cause the stuff to be fed to the saw C in a transverse oblique position. More timber, however, would be required in this latter plan than in the former, and both jointing-saws would be required in case the staves be sawed from stuff perfectly straight from end to end. The curvature of the staves may be changed by shifting the bar E longitudinally, so as to lengthen or shorten it from the shaft F, on which it turns, so as to increase or diminish the sweep or arc the stuff describes in being fed to the saw, and the bilge may be varied by shifting the arm I of the shaft H nearer to or farther from the barrel-saw C, by which the stroke or movement of arm I may be modified, and also the movement of the pulley or wheel J and saws M O.

Having thus described my invention, what I claim as new, and desire to secure by Letters Patent, is—

1. The jointing-saws M O, either or both, when used in combination with the barrel-saw C, for the purpose specified.

2. The operating or adjusting the jointing-saws M O through the medium of the shaft H connected with the bar E, as shown, the pulley or wheel J, and rods K K', connected respectively with the slide L and bar N, to which the saw-arbors are attached, substantially as set forth.

CHARLES MOWRY.

Witnesses:
WM. E. FISKE,
P. R. LAURENCE.